(12) United States Patent
Cronin (10) Patent No.: US 9,619,159 B2
(45) Date of Patent: Apr. 11, 2017

(54) STORAGE MANAGEMENT SYSTEM

(71) Applicant: GrandiOs Technologies, LLC, Wilmington, DE (US)

(72) Inventor: John Cronin, Bonita Springs, FL (US)

(73) Assignee: Grandios Technologies, LLC, Charleston, SC (US)

( * ) Notice: Subject to any disclaimer, the term of this patent is extended or adjusted under 35 U.S.C. 154(b) by 0 days.

(21) Appl. No.: 14/622,797

(22) Filed: Feb. 13, 2015

(65) Prior Publication Data

US 2015/0355855 A1    Dec. 10, 2015

Related U.S. Application Data

(60) Provisional application No. 62/007,812, filed on Jun. 4, 2014.

(51) Int. Cl.
*G06F 12/16* (2006.01)
*G06F 3/06* (2006.01)

(52) U.S. Cl.
CPC ............ *G06F 3/0619* (2013.01); *G06F 3/065* (2013.01); *G06F 3/067* (2013.01); *G06F 3/0653* (2013.01)

(58) Field of Classification Search
None
See application file for complete search history.

(56) References Cited

U.S. PATENT DOCUMENTS

| 8,495,731 | B1 | 7/2013 | Mar et al. |
| 8,589,667 | B2 | 11/2013 | Mujtaba et al. |
| 8,611,930 | B2 | 12/2013 | Louboutin et al. |
| 8,620,344 | B2 | 12/2013 | Huang et al. |
| 8,626,465 | B2 | 1/2014 | Moore et al. |
| 8,630,216 | B2 | 1/2014 | Deivasigamani et al. |
| 8,660,501 | B2 | 2/2014 | Sanguinetti |
| 8,706,044 | B2 | 4/2014 | Chang et al. |

(Continued)

FOREIGN PATENT DOCUMENTS

| EP | 2 458 512 | 5/2012 |
| WO | WO 2014/171850 | 10/2014 |
| WO | WO 2015/187503 | 12/2015 |

OTHER PUBLICATIONS

"Pebble Developer Blog" Feb. 19, 2014 https://developer.getpebble.com/blog/.

(Continued)

*Primary Examiner* — Duc Doan
(74) *Attorney, Agent, or Firm* — Polsinelli LLP (57) ABSTRACT

Systems and methods are provided for managing memory associated with a mobile electronic device by using a combination of one or more selections input by a user. The user may enter these selections through an interface displayed on a mobile electronic device. The user interface may be integrated into at least a portion of the operating system software of the mobile electronic device, or the user interface may be included in an application installed on the mobile electronic device. The application, in certain instances, presents a virtual user interface provided by an external electronic device. Memory may be managed on a mobile electronic device according to various settings. Data managed on a user's electronic device may be moved or copied to one or more other electronic devices according to the user settings.

20 Claims, 5 Drawing Sheets

(56) References Cited

U.S. PATENT DOCUMENTS

| | | |
|---|---|---|
| 8,724,723 B2 | 5/2014 | Panicker et al. |
| 8,750,207 B2 | 6/2014 | Jeong et al. |
| 8,793,094 B2 | 7/2014 | Tam et al. |
| 8,816,868 B2 | 8/2014 | Tan et al. |
| 8,831,529 B2 | 9/2014 | Toh et al. |
| 8,831,655 B2 | 9/2014 | Burchill et al. |
| 8,836,851 B2 | 9/2014 | Brunner |
| 8,843,158 B2 | 9/2014 | Nagaraj |
| 8,849,308 B2 | 9/2014 | Marti et al. |
| 8,862,060 B2 | 10/2014 | Mayor |
| 8,873,418 B2 | 10/2014 | Robinson et al. |
| 8,874,090 B2 | 10/2014 | Abuan et al. |
| 8,917,632 B2 | 12/2014 | Zhou et al. |
| 8,934,921 B2 | 1/2015 | Marti et al. |
| 2003/0137939 A1* | 7/2003 | Dunning ............... H04L 1/0057 370/235 |
| 2003/0166399 A1* | 9/2003 | Tokkonen et al. ............ 455/419 |
| 2008/0040665 A1 | 2/2008 | Waldeck |
| 2011/0307795 A1* | 12/2011 | Guillou et al. ............... 715/738 |
| 2012/0226985 A1* | 9/2012 | Chervets ............... G06F 9/4445 715/735 |
| 2013/0198435 A1 | 8/2013 | Sandadi et al. |
| 2013/0267171 A1 | 10/2013 | Sarkar et al. |
| 2013/0303192 A1 | 11/2013 | Louboutin |
| 2013/0317835 A1 | 11/2013 | Mathew |
| 2013/0328917 A1 | 12/2013 | Zambetti et al. |
| 2013/0331087 A1 | 12/2013 | Shoemaker |
| 2013/0331118 A1 | 12/2013 | Chhabra |
| 2013/0331137 A1 | 12/2013 | Burchill |
| 2013/0332108 A1 | 12/2013 | Patel |
| 2013/0332156 A1 | 12/2013 | Tackin |
| 2014/0062773 A1 | 3/2014 | MacGougan |
| 2014/0065962 A1 | 3/2014 | Le |
| 2014/0071221 A1 | 3/2014 | Dave |
| 2014/0105084 A1 | 4/2014 | Chhabra |
| 2014/0139380 A1 | 5/2014 | Ouyang |
| 2014/0141803 A1 | 5/2014 | Marti |
| 2014/0162628 A1 | 6/2014 | Bevelacqua |
| 2014/0167794 A1 | 6/2014 | Nath |
| 2014/0168170 A1 | 6/2014 | Lazarescu |
| 2014/0171114 A1 | 6/2014 | Marti |
| 2014/0180820 A1 | 6/2014 | Louboutin |
| 2014/0181935 A1* | 6/2014 | Beckmann et al. .............. 726/7 |
| 2014/0191979 A1 | 7/2014 | Tsudik |
| 2014/0200053 A1 | 7/2014 | Balasubramanian |
| 2014/0222335 A1 | 8/2014 | Piemonte |
| 2014/0232633 A1 | 8/2014 | Shultz |
| 2014/0232634 A1 | 8/2014 | Piemonte |
| 2014/0247279 A1 | 9/2014 | Nicholas |
| 2014/0247280 A1 | 9/2014 | Nicholas |
| 2014/0269562 A1 | 9/2014 | Burchill |
| 2014/0274150 A1 | 9/2014 | Marti |
| 2014/0283135 A1 | 9/2014 | Shepherd |
| 2014/0293959 A1 | 10/2014 | Singh |
| 2014/0303994 A1* | 10/2014 | Johnson ............................ 705/2 |
| 2014/0364089 A1 | 12/2014 | Lienhart |
| 2014/0364148 A1 | 12/2014 | Block |
| 2014/0365120 A1 | 12/2014 | Vulcano |
| 2015/0011242 A1 | 1/2015 | Nagaraj |
| 2015/0026623 A1 | 1/2015 | Horne |
| 2015/0031397 A1 | 1/2015 | Jouaux |

OTHER PUBLICATIONS

Shiraz, Muhammad; "A Study on Anatomy of Smartphone", Computer Communication & Collaboration (2013) May 27, 2013.
PCT Application No. PCT/US2015/033386 International Search Report and Written Opinion mailed Sep. 1, 2015.

* cited by examiner

| Use | Size | | | | Move | Where | Thumbnail | Type | Ext. |
|---|---|---|---|---|---|---|---|---|---|
| | <10 MB | 10 MB-100 MB | 100 MB-16 GB | >16 GB | | | | | |
| Daily | X | | | | Never | Phone | X | Music | .MP3 |
| Daily | | X | | | Never | Laptop | | Document | .DOCX |
| Weekly | | | | | Sometimes | Phone | X | Image | .JPEG |
| Weekly | | | X | X | Never | Laptop | X | App | .EXE |
| Monthly | | | X | | Never | Phone | X | App | .APP |
| Monthly | X | | | | Sometimes | Phone | | Note | .TXT |
| Rarely | | | | | Anytime | Cloud | X | Slideshow | .PPT |

.# STORAGE MANAGEMENT SYSTEM

CROSS-REFERENCE TO RELATED APPLICATIONS

The present application claims the priority benefit of U.S. provisional application No. 62/007,812 filed Jun. 4, 2014 and entitled "Storage Management System," the disclosure of which is incorporated herein by reference.

BACKGROUND OF THE INVENTION

1. Field of the Invention

The invention relates to managing memory on mobile electronic devices.

2. Description of the Related Art

Currently, mobile electronic devices have little or no ability to allow a user to manage memory use on their mobile electronic devices. Different electronic devices have different storage capabilities and different amounts of available memory to store data.

Mobile electronic devices like smartwatches, smartphones, and laptop computers currently have no way to collaboratively copy or move data amongst themselves or with the cloud. Moreover, smartwatches and smartphones have small memory storage capabilities compared to laptop computers or computers in the cloud.

Furthermore, there is currently no way for a user to intelligently manage data stored on mobile electronic devices based on such factors as how frequently a file is used, the size of the file, or the type of application or file. There is also no support for memory management in the operating system of many common mobile phones (e.g., Apple iOS does not support memory management).

Another limitation of mobile electronic devices is that there is currently no way for a user to view files located on different electronic devices, or to store a reference thumbnail locally on a mobile electronic device where the file represented by the thumbnail may be downloaded and viewed on demand without maintaining a persistent copy of that file on an electronic device.

There is, therefore, a need in the art for improved systems and methods of storage management for mobile devices.

SUMMARY OF THE PRESENTLY CLAIMED INVENTION

Embodiments of the present invention manage memory associated with a mobile electronic device by using a combination of one or more selections input by a user. Typically, the user enters these selections through an interface displayed on a mobile electronic device. The user interface may be integrated into at least a portion of the operating system software of the mobile electronic device, or the user interface may be included in an application installed on the mobile electronic device. The application, in certain instances, presents a virtual user interface provided by an external electronic device.

Various embodiments of the present invention manage memory on a mobile electronic device according to various settings that may include a set of user-selected preferences, frequency of access of a file, amount of memory the file consumes, and/or moving data according to a scheduled event.

Some embodiments of the present invention may include methods for storage management for mobile devices. Such methods may include determining how frequently a file is accessed by the mobile electronic device, determining the size of the file, receiving a selection of a first storage location storing the file, and determining when to store the file in the selected first storage location.

Certain embodiments of the present invention allow a user to configure their electronic devices to move, copy, or migrate their data from one electronic device to another. Electronic devices with relatively small memories can benefit from having large files stored on them moved to other electronic devices that have larger data storage capabilities. Electronic devices, in certain instances, may also protect data from loss by coping files to several different electronic devices.

DETAILED DESCRIPTION

Embodiments of the present invention manage memory associated with a mobile electronic device by using a combination of one or more selections input by a user. Typically, the user enters these selections through an interface displayed on a mobile electronic device. The user interface may be integrated into at least a portion of the operating system software of the mobile electronic device, or the user interface may be included in an application installed on the mobile electronic device. The application, in certain instances, presents a virtual user interface provided by an external electronic device. As such, memory on a mobile electronic device may be managed according to various settings that may include a set of user selected preferences, frequency of access of a file, amount of memory the file consumes, and/or moving data according to a scheduled event.

Figure 1:
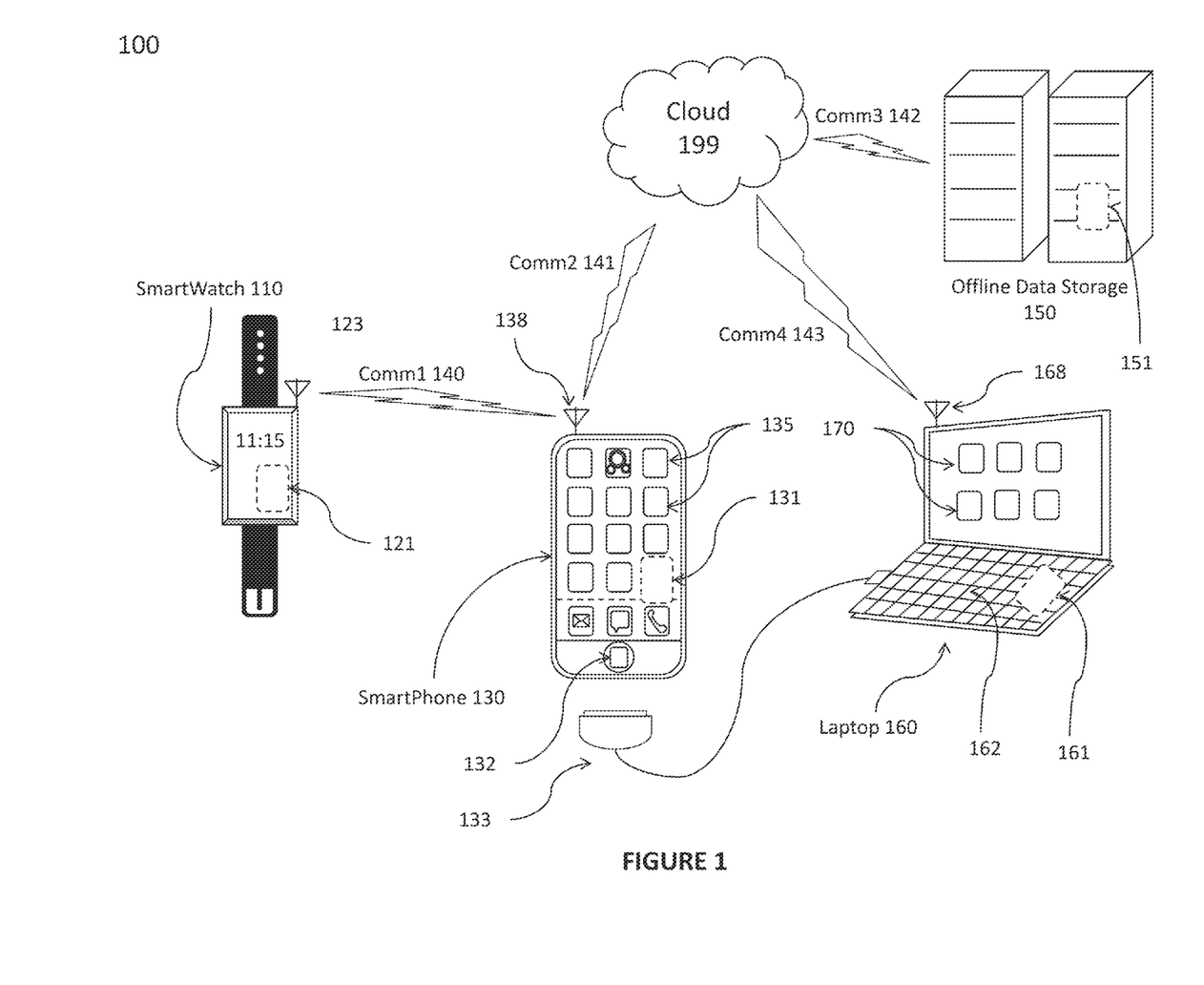
FIG. 1 illustrates an exemplary network environment in which a system for storage management for mobile devices may be implemented.

FIG. 1 illustrates an exemplary network environment 100 in which a system for storage management for mobile devices may be implemented. Network environment 100 may include smartwatch 110, smartphone 130, laptop 160, and offline data storage 150, each of which respectively includes a storage management application 121 (on smartwarch 110), 131 (on smartphone 130), 161 (on laptop 161), and 151 (on offline data storage 150).

Smartwatch 110, smartphone 130, and laptop 160 may be collectively referred to as user devices. There are any number of electronic user devices known in the art, such as general purpose computers, mobile phones, smartphones, personal digital assistants (PDAs), portable computing devices (e.g., laptop, netbook, tablets), handheld computing devices, or any other type of computing device capable of communicating over cloud communication network 199. User devices may also be configured to access data from other storage media, such as memory cards or disk drives as may be appropriate in the case of downloaded services. User device may include standard hardware computing components such as network and media interfaces, non-transitory computer-readable storage (memory), and processors for executing instructions that may be stored in memory.

Such user devices may have antennas for communicating wirelessly over cloud communication network 199. As such, smartwatch 110, smartphone 130, and laptop 160 are each illustrating as having an antenna 123 (on smartwatch 110), 138 (on smartphone 130), and 168 (on laptop 160). Such antennae 123, 138, and 168 may be an antenna or set of antennae that allows the associated user device to communicate wirelessly over the communication network 199. Such antennae 123, 138, and 168 may communicate over WiFi, 4G/3G, Bluetooth, and/or any other known radio frequency communication network known in the art.

Smartphone 130 is also illustrated as including a home button 132 and various applications 135. Home button 132 may be programmed in various ways so as to launch or initiate various actions. In that regard, home button 132 may be used to return to a home screen, to launch one or more menus, to launch a virtual assistant (e.g., SIRI on the iPhone), to turn the smartphone 130 on and off, and various other actions known in the art.

Applications 135 may include any number of software applications installed on the smartphone 130, including native applications (e.g., Notes, Messages, Camera, FaceTime, Weather, etc. on iPhone) and downloaded applications (e.g., Facebook®, Twitter®, Instagram®).

Smartphone 130 may communicate with laptop 160 via a wired connection (e.g., cable 133). Cable 133 may be used to synchronize content across smartphone 130 and laptop 160 and otherwise communicate data. In some embodiments, cable 133 may be used to transfer data in accordance with storage management needs.

Laptop 160 is illustrated as including a keyboard 162, applications 170, and antenna 168. Keyboard 162 may be any keyboard known in the art. Likewise, antenna 168 may include any type of antenna for communicating wirelessly over any of the wireless communication networks known in the art.

Applications 170 may include any number of software applications installed on laptop 170. As applications may generally be developed for a particular type device, applications 170 may or may not correspond to applications 135. Applications 135 may not have a counterpart available for laptop 160, and vice versa. Some applications 135, however, may have a corresponding, but different counterpart in applications 170. For example, an application developer may have developed different versions of an application for the different devices and platforms.

The storage management applications 121, 131, 161, and 151 provides each of the associated electronic devices with storage management functionalities for moving, copying, and/or accessing files located on one of the various devices. For example, the storage memory program application 121 on smartwatch 110 may share data with smartphone 130 through a wireless data communication path, comm1 140. This may be accomplished using Bluetooth™ antenna 123 on smartwatch 110, and antenna 138 on the smartphone.

Cloud communication network 199 may be a local, proprietary network (e.g., an intranet) and/or may be a part of a larger wide-area network. Communication network 199 may comprise a variety of connected computers that may provide a set of network-based services. Such network service may be provided by real server hardware and/or by virtual hardware as simulated by software running on one or more real machines. Such virtual servers may not physically exist and can therefore be moved around and scaled up (or down) on the fly without affecting end-users (e.g., like a cloud).

Communication network 199 allow for communication between the devices of network environment 100 via various communication paths or channels (e.g., communication channels 140, 141, 142, and 143). As illustrated, a first communication channel (comm1) 140 may be used to communicate data between smartwatch 110 and smartphone 130. A second communication channel (comm2) 141 may be used to communicate data between smartphone 130 and the cloud 199. A third communication channel (comm3) may be used to communicate data between the cloud 199 and offline data storage 150. Finally, a fourth communication may be used to communicate data between laptop 160 and the cloud 199. Although four possible communication channels are illustrated, there may be any number of channels that may be created between the various devices. Such channels may transmit data directly from device to device, or may be relayed through another device or through the cloud. For example, data may be communicated from smartphone 130 through the cloud 199 to laptop 160. Alternatively smartphone 130 may transmit data directly to laptop 160 through a wired connection (e.g., cable 133), as well as through a wireless connection (e.g., antenna 138 of smartphone 130 communicating with antenna 168 of laptop 160).

Such paths or channels may include any type of data communication link known in the art, including TCP/IP connections and Internet connections via Wi-Fi, Bluetooth, UMTS, etc. In that regard, communications network 199 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider.

Figure 2:
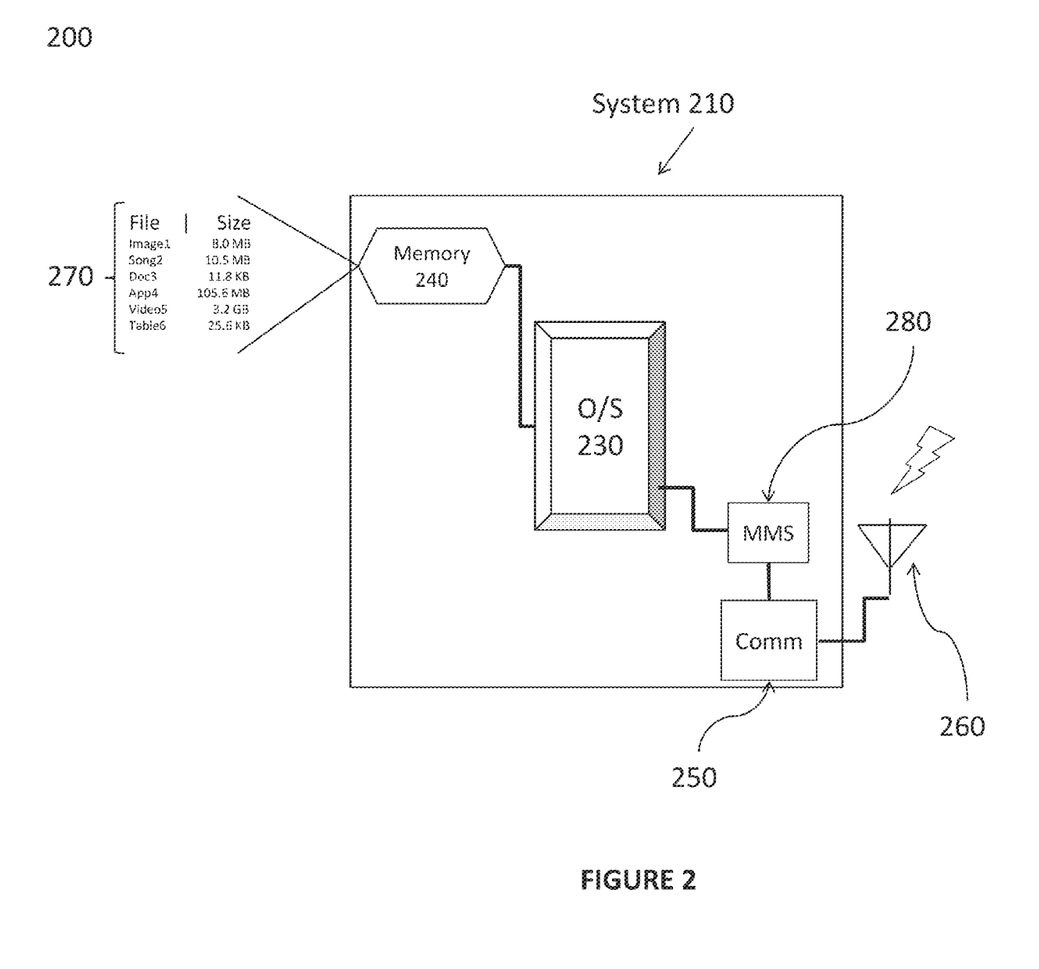
FIG. 2 is a diagram illustrating an exemplary system architecture 210 of a user device that may be used in a system for storage management for mobile devices.

FIG. 2 is a diagram illustrating an exemplary system architecture 210 of a user device that may be used in a system for storage management for mobile devices. System 210 may include an operating system (OS) 230, memory 240, communication interface 250, antenna 260, file profile 270, and memory management system software (MMS) 280.

Operating system (OS) 230 is a collection of software that manages computer hardware resources and provides common services for computer programs, including applications (e.g., applications 135 and 170 and memory management system software 280). The operating system 230 is an essential component of the system software in a computer system. Applications 135 and 170 and memory management system software 280 may be developed for a specific operation system 230 and therefore rely on the associated operating system 230 to perform its functions. For hardware functions such as input and output and memory allocation, the operating system 230 acts as an intermediary between memory management system software 280 and the computer hardware. Although application code is usually executed directly by the hardware, memory management system software 280 may make a system call to an OS function or be interrupted by it. Operating systems 230 can be found on almost any device with computing or processing ability. Examples of popular modern operating systems include Android, BSD, iOS, Linux, OS X, QNX, Microsoft Windows, Windows Phone, and IBM z/OS. Most of these (except Windows, Windows Phone and z/OS) may share roots in UNIX.

Operating system settings of operating system 230 may be a software function that opens a display that lists OS functions that may be generated upon selection of a user interface button. Such a list of OS functions may be associated with various options that allow the user to designate certain preferences or settings with respect to how certain operating system functions are performed (e.g., display preferences, wireless network preferences, information sharing, accessibility of applications to system information, such as GPS/location, notifications). Once these settings are set, the operating system 230 uses the settings to perform various functions, which includes functions related to execution of memory management system software 280.

Memory 240 may include any type of memory, database, or storage device known in the art. In terms of storage management, memory 240 may be used to store various files locally on a particular device, as well as user settings related to how the user wants to manage storage, and/or any information related to the same. Memory 240 may be an organized collection of data, which may be typically organized to model relevant aspects of reality in a way that supports processes requiring this information.

Communication interface 250 and antenna 260 may be specific to a particular type of user device and/or types of communication networks over which the user device is designed to communicate. As discussed above with respect to the cloud communication network 199, such communication networks may encompass any type of wireless communication network known in the art.

File profile 270 provides information regarding files stored in memory 240. Such information may include file names and file size. The illustrated file profile 270 indicates that image file Image1 has a size 8.0 MB, song file Song2 has a size of 10.5 MB, document file Doc3 has a size of 11.8 KB, application file App4 has a size of 105.6 MB, video file Video5 has a size of 3.2 GB, and table file Table6 has a size of 25.6 KB. MB refers to mega-bytes, KB refers to kilo-bytes, and GB refers to giga-bytes of memory consumed by a file.

Figure 3:
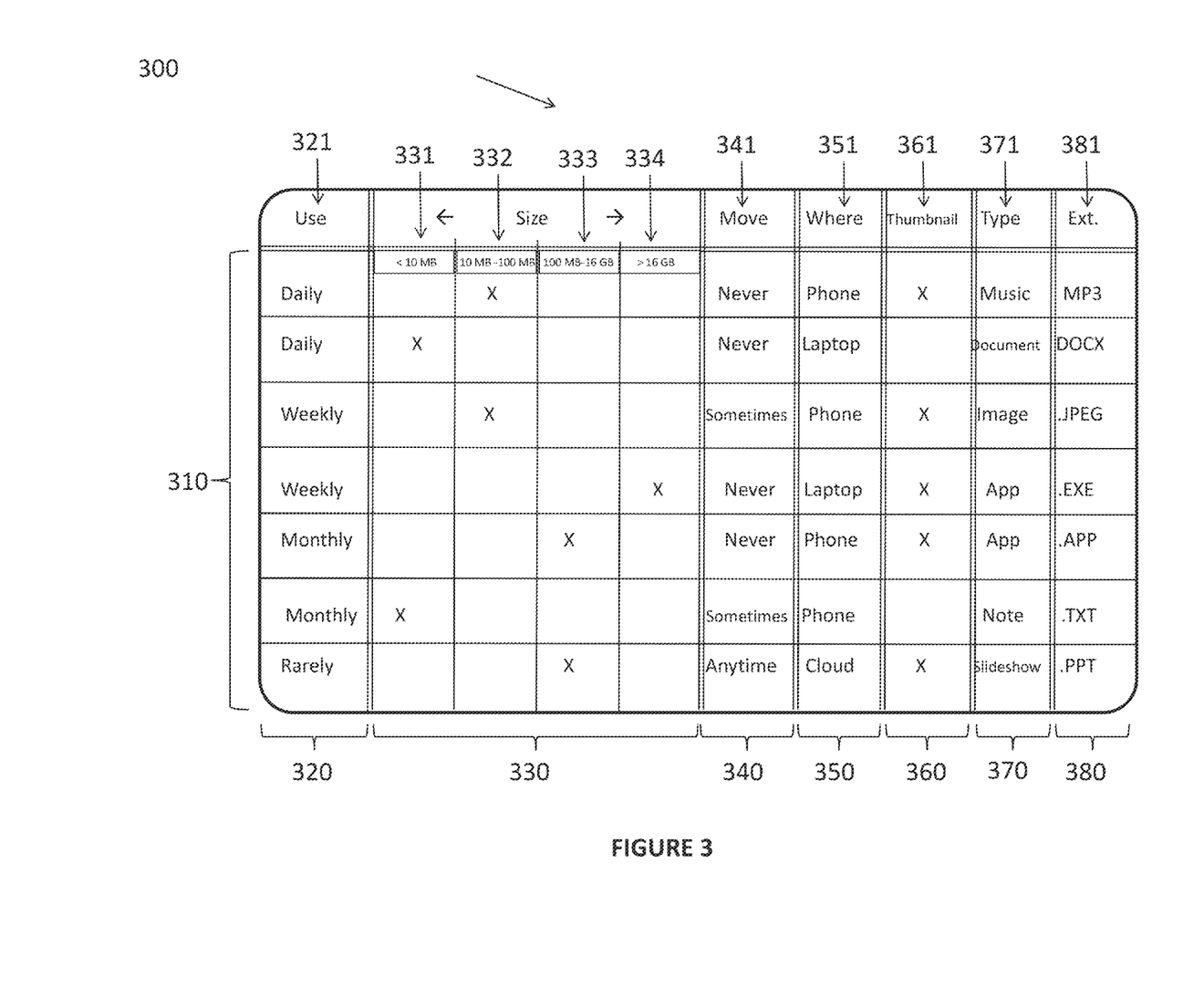
FIG. 3 illustrates an exemplary graphical user interface on a mobile device that may be used in a system for storage management.
Figure 4:
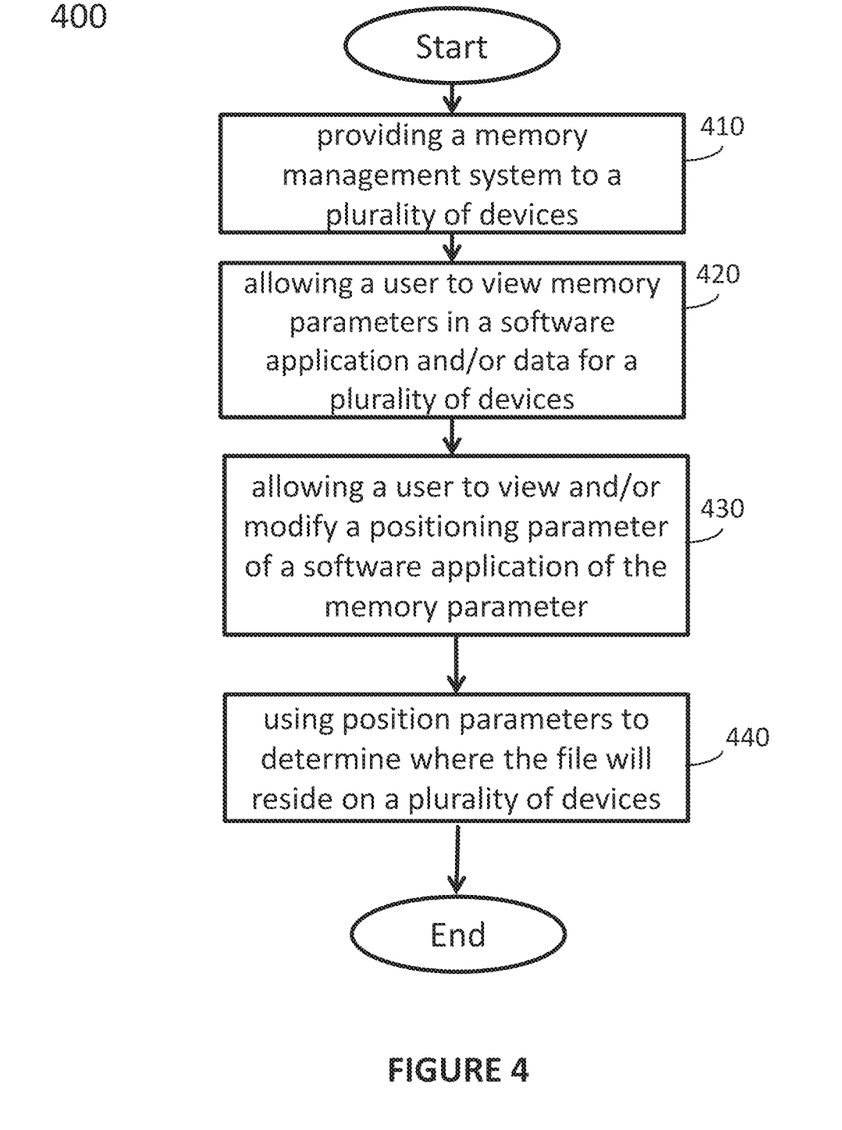
FIG. 4 is a flowchart illustrating an exemplary method for storage management for mobile devices.

Memory management system software 280 may be executed to provide storage management as described in further detail with respect to FIGS. 3 and 4. Specifically, memory management system software 280 may be aware of corresponding software on other user devices associated with the user. For example, a user may have a smartphone, a smartwatch, a laptop, and a cloud storage account at a remote cloud or storage server. Each of the devices may have a corresponding instance of memory management system software 280. The MMS 280 on each device may be in communication (e.g., via communication network) with their counterparts on the other device. As such, each device may provide a user with a current listing of files on each user device, as well as an integrated graphical user interface (e.g., GUI 300 of FIG. 3) that allows the user to designate priorities and parameters for storing and moving certain files among the devices.

FIG. 3 illustrates an exemplary graphical user interface (GUI) 300 on a mobile device that may be used in a system for storage management. Such a GUI 300 provides a display of a table providing a listing 310 of all files on any of the user devices associated with the user. Such listing 310 may organize data regarding the files into columns and rows. Each row may be associated with a particular file, while each column provides different types of data describing each file.

Column 320 having header 321 (e.g., "Use") pertains to a description of how frequently (e.g., daily, weekly, monthly, and rarely) each particular file has been accessed and/or used. Column(s) 330 having headers 331-334 provides information regarding size of a particular file. Each of the headers 331-334 provide a different size range (e.g., smaller than 10 MB, between 10 MB and 100 MB, between 100 MB and 16 GB, and larger than 16 GB) into which a file a fall. Note that there is only one X mark contained in columns 330 for each individual row 310 in the table.

Column 340 having header 341 (e.g., Move) pertains to permissions for each file regarding whether such file is allowed to be moved to another user device. Column 350 having header 351 (e.g., Where) identifies the user device at which the file is currently located. Column 360 having header 361 (e.g., Thumbnail) pertains to user preference as to whether or not the file may be associated with a thumbnail image. Column 370 having header 371 (e.g., Type) indicate the type of file, and column 380 having header 381 (e.g., Ext) identifies a file extension of the file.

For example, the first file (as described by the first row) is used daily, has a size between 10 MB and 100 MB, is never allowed to be moved, is currently located at the Phone, has an associated thumbnail, is a music file, and has an MP3 file extension.

The type of information shown in GUI 300 is merely exemplary. GUI 300 may include any type of information that may describe any file on any user device. In certain instances, the type of information being tracked may be edited by the user to add new columns or edit existing columns. For example, the permissions for moving a file (e.g., column 340) may be changed to permissions for copying a file. Thus, when a user wishes to retain a copy of that file in his laptop, the user may select "Copy" instead of "Move".

FIG. 4 is a flowchart illustrating an exemplary method for storage management for mobile devices. In step 410, a storage management system may be provided to a plurality of devices. Such a storage management system may be part of an operating system, a native application, or a downloaded application.

In step 420, a user is provided with a view of memory parameters for a plurality of devices. The storage management system on each device may share information regarding their respective resident files, such that the user may view information regarding all files on all devices in an integrated GUI. Such GUI may also provide the user with options and tools for adding or otherwise customizing memory parameters to the user's particular needs and preferences.

In step 430, the user may modify a parameter for storage management. Such modification may occur via a GUI that provides for a variety of different options. For example, the GUI may provide information regarding a particularly large video file on the phone that is only used rarely. The user may decide to allow that file to be moved, if storage on the phone is needed (e.g., if available memory drops below a threshold). As such, the user may designate that the file is allowed to be moved and further, if such move be necessary, the file should be moved to the cloud.

In step 440, the parameter(s) may be used to determine when the file may be moved and the destination to which the file is to be moved. Referring to the foregoing example, the storage management software may monitor a current state of storage of its associated device. When certain parameters are met (e.g., available memory drops below 10% or below 10 MB), the storage management software may communicate with its counterpart in a cloud server. In conjunction, the two instances of storage management software may coordinate the transmission of the video file from the phone to the cloud server. The GUI may also be updated to reflect the new location of the file.

Typically, the method of the invention will be implemented within each of a plurality of electronic devices. Devices with relatively small memory storage capacities (like a smartwatch), will tend to benefit from moving lager files frequently to the cloud or to a laptop computer. Where devices with larger local memory storage capacities will be more likely to retain large files on their laptop, yet store a copy on the cloud.

In instances where the memory management system is implemented through a virtual interface, an image of a user interface from the cloud could be viewed on the user's smartwatch. Settings entered by the user could then be received by a computer in the cloud, where that computer prompts the smartwatch to move, or copy data to the cloud. Such a virtual interface presented on a mobile electronic device reduces the amount of memory that must be used on that mobile electronic device to perform memory management functions consistent with the present invention.

In other instances, a thumbnail stored locally on a mobile electronic device references a file that is stored on another electronic device. In this instance, when a user selects a particular thumbnail, the file referenced by that thumbnail will be downloaded and presented to the user.

Users may use any number of different electronic user devices, such as general purpose computers, mobile phones, smartphones, personal digital assistants (PDAs), portable computing devices (e.g., laptop, netbook, tablets), desktop computing devices, handheld computing device, or any other type of computing device capable of communicating over communication network. User devices may also be configured to access data from other storage media, such as memory cards or disk drives as may be appropriate in the case of downloaded services. User device may include standard hardware computing components such as network and media interfaces, non-transitory computer-readable storage (memory), and processors for executing instructions that may be stored in memory.

Communication networks allow for communication between the user device, cloud social media system, and third party developers via various communication paths or channels. Such paths or channels may include any type of data communication link known in the art, including TCP/IP connections and Internet connections via Wi-Fi, Bluetooth, UMTS, etc. In that regard, communication networks may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network allows for communication between any of the various components of network environment.

Figure 5:
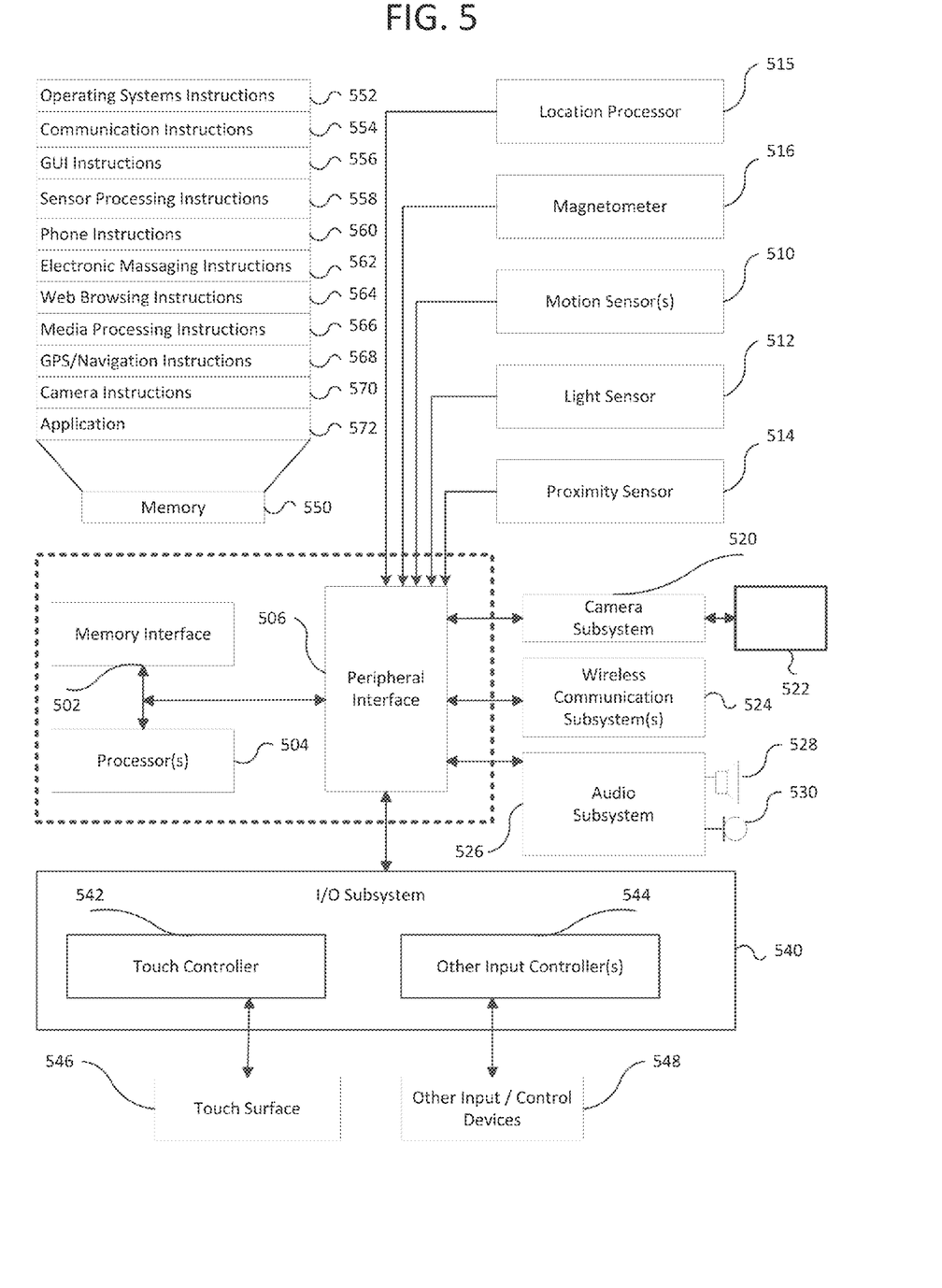
FIG. 5 illustrates a mobile device architecture that may be utilized to implement the various features and processes described herein.

FIG. 5 illustrates a mobile device architecture that may be utilized to implement the various features and processes described herein. Architecture 500 can be implemented in any number of portable devices including but not limited to smart phones, electronic tablets, and gaming devices. Architecture 500 as illustrated in FIG. 6 includes memory interface 502, processors 504, and peripheral interface 506.

Memory interface 502, processors 504 and peripherals interface 506 can be separate components or can be integrated as a part of one or more integrated circuits. The various components can be coupled by one or more communication buses or signal lines.

Processors 504 as illustrated in FIG. 5 is meant to be inclusive of data processors, image processors, central processing unit, or any variety of multi-core processing devices. Any variety of sensors, external devices, and external subsystems can be coupled to peripherals interface 506 to facilitate any number of functionalities within the architecture 500 of the exemplar mobile device. For example, motion sensor 510, light sensor 512, and proximity sensor 514 can be coupled to peripherals interface 506 to facilitate orientation, lighting, and proximity functions of the mobile device. For example, light sensor 512 could be utilized to facilitate adjusting the brightness of touch surface 546. Motion sensor 510, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 506, such as a temperature sensor, a biometric sensor, or other sensing device to facilitate corresponding functionalities. Location processor 515 (e.g., a global positioning transceiver) can be coupled to peripherals interface 506 to allow for generation of geo-location data thereby facilitating geo-positioning. An electronic magnetometer 516 such as an integrated circuit chip could in turn be connected to peripherals interface 506 to provide data related to the direction of true magnetic North whereby the mobile device could enjoy compass or directional functionality. Camera subsystem 520 and an optical sensor 522 such as a charged coupled device (CCD) or a complementary metal-oxide semiconductor (CMOS) optical sensor can facilitate camera functions such as recording photographs and video clips.

Communication functionality can be facilitated through one or more communication subsystems 524, which may include one or more wireless communication subsystems. Wireless communication subsystems 524 can include 802.x or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 524 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.x communication networks, code division multiple access (CDMA) networks, or Bluetooth networks. Communication subsystem 524 may include hosting protocols such that the device may be configured as a base station for other wireless devices. Communication subsystems can also allow the device to synchronize with a host device using one or more protocols such as TCP/IP, HTTP, or UDP.

Audio subsystem 526 can be coupled to a speaker 528 and one or more microphones 530 to facilitate voice-enabled functions. These functions might include voice recognition, voice replication, or digital recording. Audio subsystem 526 in conjunction may also encompass traditional telephony functions.

I/O subsystem 540 may include touch controller 542 and/or other input controller(s) 544. Touch controller 542 can be coupled to a touch surface 546. Touch surface 546 and touch controller 542 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 546 may likewise be utilized. In one implementation, touch surface 546 can display virtual or soft buttons and a virtual keyboard, which can be used as an input/output device by the user.

Other input controllers 544 can be coupled to other input/control devices 548 such as one or more buttons, rocker switches, thumb-wheels, infrared ports, USB ports, and/or a pointer device such as a stylus. The one or more buttons (not shown) can include an up/down button for volume control of speaker 528 and/or microphone 530. In some implementations, device 500 can include the functionality of an audio and/or video playback or recording device and may include a pin connector for tethering to other devices.

Memory interface 502 can be coupled to memory 550. Memory 550 can include high-speed random access memory or non-volatile memory such as magnetic disk storage devices, optical storage devices, or flash memory. Memory 550 can store operating system 552, such as Darwin, RTXC, LINUX, UNIX, OS X, ANDROID, WINDOWS, or an embedded operating system such as VxWorks. Operating system 552 may include instructions for handling basic system services and for performing hardware dependent tasks. In some implementations, operating system 552 can include a kernel.

Memory 550 may also store communication instructions 554 to facilitate communicating with other mobile computing devices or servers. Communication instructions 554 can also be used to select an operational mode or communication medium for use by the device based on a geographic location, which could be obtained by the GPS/Navigation instructions 568. Memory 550 may include graphical user interface instructions 556 to facilitate graphic user interface processing such as the generation of an interface; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes, camera instructions 570 to facilitate camera-related processes and functions; and instructions 572 for any other application that may be operating on or in conjunction with the mobile computing device. Memory 550 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 550 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, and communications capability.

The figures included with this disclosure are for the purpose of illustrating the invention. The figures show aspects of one or more embodiments of the invention and are examples, the figures are not meant to limit the scope of the invention. So it should be understood that the present invention is not limited to the precise arrangements and instrumentalities shown in the figures.

What is claimed is:

1. A method for managing memory on a mobile device, the method comprising:

receiving over a communication network at the mobile device an image of a user interface, wherein the user interface corresponds to at an external computing device, the image of the user interface includes one or more settings previously set over the user interface that corresponds to the external computing device, wherein the mobile device and the external computing device both include storage management system software for sharing information regarding user file data stored at the mobile device and stored at the external computing devices according to the one or more settings, and wherein the one or more settings correspond to one or more user parameters for moving the user file data between at least the mobile device and a destination device according to the one or more parameters;

storing information in a memory at the mobile device regarding a plurality of files stored at the mobile device, wherein the stored information for the plurality of files corresponds to the one or more parameters relating to the movement of data to the destination device;

executing a storage management application stored in the memory, wherein execution of the storage management application by a processor:

monitors a current storage state of the mobile device, identifies that the current storage state of the mobile device has fallen below a threshold, and retains or removes an identified first file of the plurality of files based on the parameters associated with the identified first file;

sending a communication to the external computing device, wherein the communication coordinates the transmission of the identified first file to the destination device according to the one or more settings; and transmitting the identified first file over the communication network to the identified destination device according to the one or more settings receiving a prompt from the external computing device to transmit a second file to a second destination device according to the one or more settings; and transmitting the second file to the second destination device over a communication interface after receiving the prompt from the external computing device.

2. The method of claim 1, wherein the destination device is associated with a same user as the mobile device.

3. The method of claim 1, wherein the destination device is at least one of a smart device and a computing device.

4. The method of claim 1, wherein a user of the mobile device is associated with a plurality of destination devices including the destination device, and the method further comprising generating a display that lists files on the mobile device and files on each of the destination devices including the destination device.

5. The method of claim 4, wherein the display comprises a plurality of fields, and one or more of the fields of the plurality of fields is edited by the user.

6. The method of claim 4, further comprising receiving information sent over the communication network from each of the destination devices including the destination device regarding a respective set of files stored thereon.

7. The method of claim 1, wherein the parameters include at least one of frequency of use, file size, permissions for moving, permissions for copying, thumbnails, file type, and file extension.

8. The method of claim 1, wherein the one or more parameters identify the destination device.

9. The method of claim 1, further comprising updating the stored information regarding the identified first file, wherein the update indicates that the identified first file is currently located at the destination device.

10. The method of claim 1, wherein the communication interface is a first communication interface at the mobile device and the communication network corresponds to a second communication interface at the mobile device.

11. An apparatus for managing memory on a mobile electronic device, the apparatus comprising:

a communication interface that receives an image of a user interface, wherein the user interface corresponds to an external computing device, the image of the user interface includes one or more settings previously set over the user interface that corresponds to the external computing device, wherein the mobile device and the external computing device both include storage management system software for sharing information regarding user file data stored at the mobile device and stored at the external computing devices according to the one or more settings, and wherein the one or more settings correspond to one or more user parameters for moving the user file data between at least the mobile device and a destination device according to the one or more parameters;

a memory at the mobile device that stores information regarding a plurality of files at the mobile device, wherein the stored information for the plurality of files corresponds to the one or more parameters relating to the movement of data to the destination device;

a processor that executes a storage management application stored in the memory, wherein execution of the storage management application by the processor:

monitors a current storage state of the mobile device, identifies that the current storage state of the mobile device has fallen below a threshold, retains or removes an identified first file of the plurality of files based on the parameters associated with the identified first file, wherein a communication is sent to the external computing device that coordinates the transmission of the identified first file to the destination device according to the one or more settings, and the transmits the identified first file is transmitted to the identified destination device over the communication interface, wherein:

a prompt is received over the communication interface from the external computing device to transmit a second file to a second destination device according to the one or more settings; and the second file is transmitted to the second destination device over the communication interface or over a second communication interface after receiving the prompt from the external computing device.

12. The apparatus of claim 11, wherein the destination device is associated with a same user as the mobile device.

13. The apparatus of claim 11, wherein the destination device is at least one of a smart device and a computing device.

14. The apparatus of claim 11, wherein a user of the mobile device is associated with a plurality of destination devices including the destination device, and wherein the processor executes the storage management application to generate a display that lists files on the mobile device and files on each of the destination devices including the destination device.

15. The apparatus of claim 14, wherein the display comprises a plurality of fields, and one or more of the fields of the plurality of fields is edited by the user.

16. The apparatus of claim 14, wherein the communication interface further receives information sent over the communication network from each of the destination devices including the destination device regarding a respective set of files stored thereon.

17. The apparatus of claim 11, wherein the parameters include at least one of frequency of use, file size, permissions for moving, permissions for copying, thumbnails, file type, and file extension.

18. The apparatus of claim 11, wherein the one or more parameters identify the destination device.

19. The apparatus of claim 11, wherein the stored information regarding the identified first file is updated, and the updated information indicates that the identified first file is currently located at the destination device.

20. A non-transitory computer-readable storage medium, having embodied thereon a program executable by a processor to perform a method for managing memory on a mobile device, the method comprising:
- receiving over a communication network at the mobile device an image of a user interface, wherein the user interface corresponds to an external computing device, the image of the user interface includes one or more settings previously set over the user interface that corresponds to the external computing device, wherein the mobile device and the external computing device both include storage management system software for sharing information regarding user file data stored at the mobile device and stored at the external computing devices according to the one or more settings, and wherein the one or more settings correspond to one or more user parameters for moving the user file data between at least the mobile device and a destination device according to the one or more parameters;
- storing information in a memory at the mobile device regarding a plurality of files at the mobile device, wherein the stored information for the plurality of files corresponds to the one or more parameters relating to the movement of data to the destination device;
- executing a storage management application stored in the memory, wherein execution of the storage management application by a processor:
  - monitors a current storage state of the mobile device,
  - identifies that the current storage state of the mobile device has fallen below a threshold, and
- retains or removes an identified first file of the plurality of files based on the parameters associated with the identified first file;
- sending a communication to the external computing device, wherein the communication coordinates the transmission of the identified first file to the destination device according to the one or more settings;
- transmitting the identified first file over the communication network to the identified destination device according to the one or more settings;
- receiving a prompt from the external computing device to transmit a second file to a second destination device according to the one or more settings; and
- transmitting the second file to the second destination device over a communication interface after receiving the prompt from the external computing device.

* * * * *